FIG.1

Jan. 19, 1965  G. R. STEVENS ETAL  3,166,214
MACHINE FOR AUTOMATICALLY EJECTING CUSTOMERS' CARDS WHEN
FUEL DELIVERY IS DUE AND FOR OTHER PURPOSES
Filed Oct. 24, 1962  7 Sheets-Sheet 2

INVENTORS.
GEORGE R. STEVENS
JAMES J. STIPO
BY
F. Ledermann
ATTORNEY

INVENTORS.
GEORGE R. STEVENS
JAMES J. STIPO
BY J. Lederman
ATTORNEY

Jan. 19, 1965        G. R. STEVENS ETAL        3,166,214
MACHINE FOR AUTOMATICALLY EJECTING CUSTOMERS' CARDS WHEN
FUEL DELIVERY IS DUE AND FOR OTHER PURPOSES
Filed Oct. 24, 1962                               7 Sheets-Sheet 6

INVENTORS.
GEORGE R. STEVENS
JAMES J. STIPO
BY
*F. Ledermann*
ATTORNEY

| 45 | 40 | 35 | 30 | 25 | | | | | K-7 | 450 | 445 | 440 |
|---|---|---|---|---|---|---|---|---|---|---|---|---|
| 90 | 80 | 70 | 60 | 50 | 40 | 30 | 20 | 10 | K-3.5 | 900 | 890 | 880 |
| 180 | 160 | 140 | 120 | 100 | 80 | 60 | 40 | 20 | K-1.75 | 1800 | 1780 | 1740 |
| 360 | 320 | 280 | 240 | 200 | 160 | 120 | 80 | 40 | K-.875 | 3600 | 3560 | 3480 |

126b:

| 45 | 40 | 35 | 30 | 25 | | | | | K-6 | 450 | 445 | 440 |
|---|---|---|---|---|---|---|---|---|---|---|---|---|
| 90 | 80 | 70 | 60 | 50 | 40 | 30 | 20 | 10 | K-3 | 900 | 890 | 880 |
| 180 | 160 | 140 | 120 | 100 | 80 | 60 | 40 | 20 | K-1.5 | 1800 | 1780 | 1740 |
| 360 | 320 | 280 | 240 | 200 | 160 | 120 | 80 | 40 | K-.75 | 3600 | 3560 | 3480 |

126c:

| 45 | 40 | 35 | 30 | 25 | | | | | K-5 | 450 | 445 | 440 |
|---|---|---|---|---|---|---|---|---|---|---|---|---|
| 90 | 80 | 70 | 60 | 50 | 40 | 30 | 20 | 10 | K-2.5 | 900 | 890 | 880 |
| 180 | 160 | 140 | 120 | 100 | 80 | 60 | 40 | 20 | K-1.25 | 1800 | 1780 | 1740 |
| 360 | 320 | 280 | 240 | 200 | 160 | 120 | 80 | 40 | K-.625 | 3600 | 3560 | 3480 |

126d:

| 45 | 40 | 35 | 30 | 25 | | | | | K-4 | 450 | 445 | 440 |
|---|---|---|---|---|---|---|---|---|---|---|---|---|
| 90 | 80 | 70 | 60 | 50 | 40 | 30 | 20 | 10 | K-2 | 900 | 890 | 880 |
| 180 | 160 | 140 | 120 | 100 | 80 | 60 | 40 | 20 | K-1 | 1800 | 1780 | 1740 |
| 360 | 320 | 280 | 240 | 200 | 160 | 120 | 80 | 40 | K-.5 | 3600 | 3560 | 3480 |

INVENTORS.
GEORGE R. STEVENS
JAMES J. STIPO
BY J. Ledermann
ATTORNEY

United States Patent Office 3,166,214
Patented Jan. 19, 1965

3,166,214
MACHINE FOR AUTOMATICALLY EJECTING CUSTOMERS' CARDS WHEN FUEL DELIVERY IS DUE AND FOR OTHER PURPOSES
George R. Stevens and James J. Stipo, both of 291 River Road, Bogota, N.J.
Filed Oct. 24, 1962, Ser. No. 232,769
22 Claims. (Cl. 221—4)

The invention relates to the recording of accumulated fuel oil consumption by customers whereby the supplier may be informed, daily or otherwise, as to which of his customers will require fuel delivery on the instant day.

Ordinarily such suppliers employ so-called "degree day clerks" whose duty it is to keep and compile daily records of all customers so that when a given number of degree days has accumulated since the last delivery to a customer the truck dispatcher may be notified to make a delivery. This is tedious work and it is subject to error both in arithmetical calculations and in truck dispatching.

It is an object of the present invention to provide a machine which, upon daily or periodical actuation thereof, will eject from the machine the record or file cards of all those customers who require fuel delivery on the given day.

Briefly the invention includes a frame supporting an upright cylindrical structure having a series of vertically spaced circumferential bands, with annular turntables rotatably mounted in the spaces between the bands. The turntables are provided throughout their circumferences with spaced radial pockets or compartments in which customers' file cards are placed. In the case of a relatively small business having, for example, less than one thousand customers, but a single such turntable or tier of pockets need be provided. For each turntable an automatically actuated card ejector is provided, and these ejectors are normally positioned in a common vertical plane. A guide chute or the like, or a baffle, is preferably provided in this plane to guide the ejected cards into a receptacle. Means is provided for rotating the turntables simultaneously. The turntables are geared to a main drive shaft at different gear ratios so that they move through arcs of different lengths during rotation of the shaft. Means is also provided for setting the machine prior to actuation thereof whereby upon actuation it will advance the pockets of the turntables toward the ejecting position through arcuate distances which are for all the turntables proportionate to the said number of degree days.

To obtain the said number of degree days, an automatic degree day calculator may be used as an acecssory; such calculators are available on the market. Or the said number of degree days may be obtained from reports of the local Weather Bureau Service.

The circumferential bands of the cylindrical structure are provided with rows of columnar graduations bearing indicia related primarily to the rate of fuel oil consumption per degree day of the customers whose file cards are filed in the pockets of the turntable immediately above the band. After a customer's card has been ejected it is replaced in a pocket, of the same turntable, which is positioned above that column on the band which is indicative of the number of future degree days after which the customer will require another delivery.

The machine illustrated and herein described includes a separately actuable turntable or rotatable tier of pockets for customers who are large consumers of fuel oil independently of the accumulated degree days since the last previous delivery; for example, industrial establishments.

The above broad as well as additional and more specific objects will become apparent in the following description wherein reference numerals refer to like-numbered parts in the accompanying drawings. It is to be noted that the drawings are intended primarily for the purpose of illustration and that it is therefore neither desired nor intended to limit the invention necessarily to any or all of the exact details shown or described except insofar as they may be deemed essential to the invention.

Referring briefly to the drawings.

Figure 3:
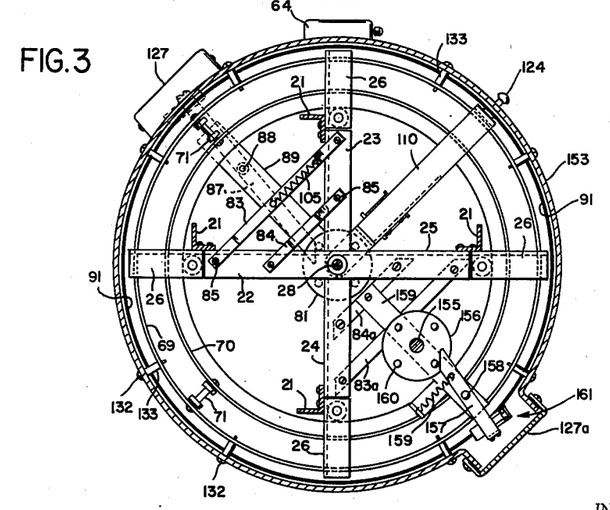
FIG. 3 is a sectional view taken on the line 3—3 of FIG. 1.

The machine includes a base 20 from which four uprights 21, shown as channel irons equidistantly circumferentially spaced as well as equidistantly inwardly spaced from the circumferential edge of the base, extend. In vertically spaced parallel planes, cross-members 22, 23, 24 and 25, also shown as channel members, are secured to the uprights 21 (FIG. 3). In alignment with the members 22, 23, 24 and 25 are radial extensions thereof, shown at 26, also secured to the uprights 21.

Figure 2:
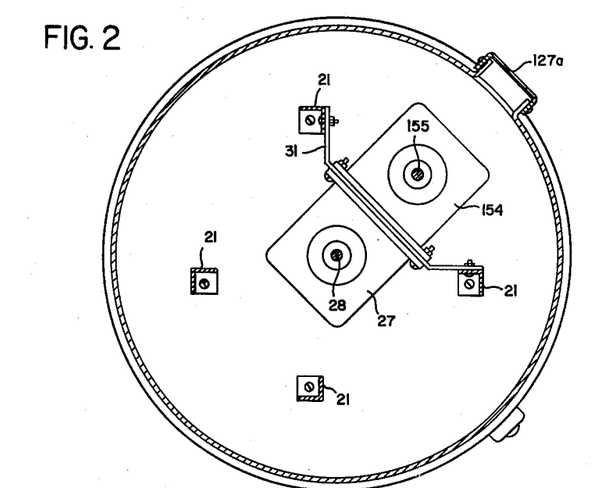
FIG. 2 is a sectional view taken on the line 2—2 of FIG. 1.

An electric motor 27 is mounted axially on the base 20 and its shaft 28 is directly coupled by a coupling, not shown, to a vertical axial shaft 29 which extends upward through the cross-members through suitable openings or bearings 30 provided therein. This motor is also secured to two of the uprights 21 by means of a bracket 31, FIG. 2.

Figure 4:
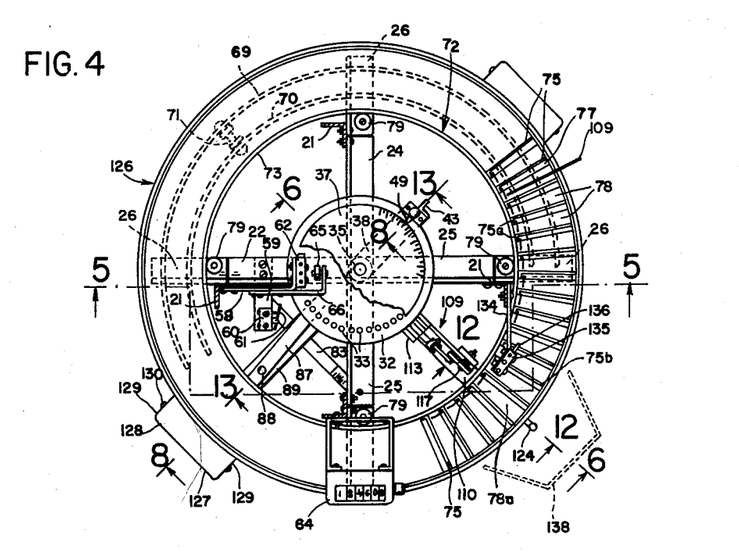
FIG. 4 is a fragmentary top plan view of the machine, with the cover removed.
Figure 5:
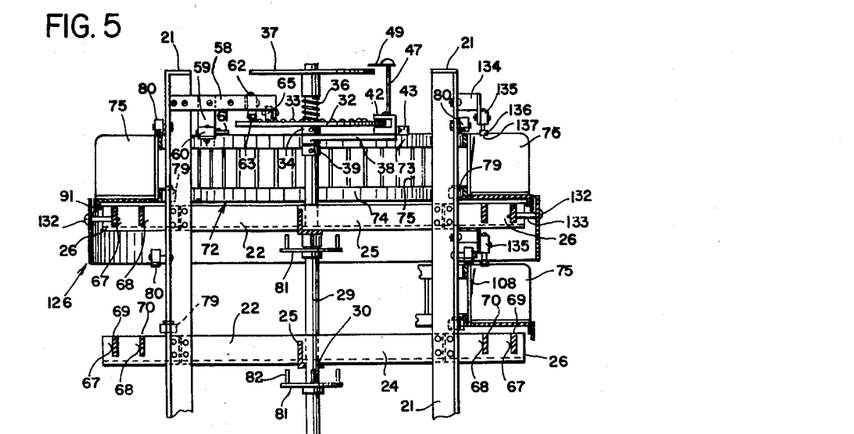
FIG. 5 is a fragmentary sectional view taken on the line 5—5 of FIG. 4.
Figure 13:
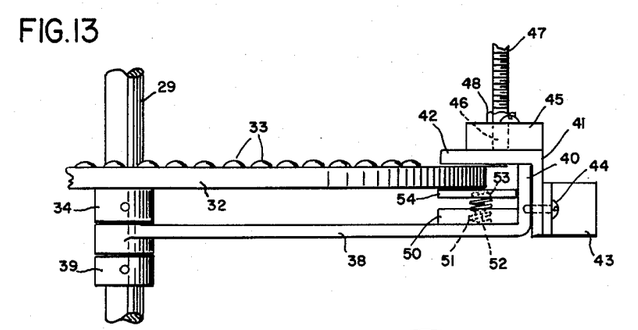
FIG. 13 is a fragmentary sectional view taken on the line 13—13 of FIG. 4.

A circular plate 32 is mounted on the shaft 29 by means of a set screw passed through a collar 34 thereon. This plate has adjacent its periphery a plurality of equidistant circumferentially arranged upward projections or knobs 33 (FIGS. 4, 5 and 13). Rotatably mounted on the upper end of the shaft 29 between an enlarged head 35 on the shaft and a coiled spring 36 bearing against the plate 32, is a graduated disc 37 which is graduated in degree days. A crank 38 is pivoted to the shaft 29 between the collar 34 and a second collar 39 locked to the shaft. The outer end of the crank 38 is turned upward at right angles to provide an upward extension 40 spaced from the peripheral edge of the plate 32. An angle-shaped member 41 is secured against the extension 40 and its horizontal web 42 is positioned over the plate 32 radially outward from the knobs 33. A lug 43 is secured to the member 41 in alignment with the crank 38, by means of screws 44 which also secure the angle 41 to the extension 40. A block 45 is rigid with the web 42 and is provided with a threaded vertical bore 46 into which a stud 47 is threaded and locked therein by a nut 48.

On its upper extremity the stud 47 carries a pointer 49 which extends over the periphery of the disc 37. At the outer end of the crank 38 and against the extension 40, a small plate 50 is secured to the upper surface of the crank, and is provided with a bore 51. A coiled compression spring 52 has one end registering in this bore and the other end registering in a bore 53 in the bottom of a similar small plate 54 positioned under plate 32. Thus a spring biased clutch is provided which ordinarily clamps the stud 47 and the crank 38 to which it is attached, to the plate 32, so that when the plate rotates the crank and stud move along with it about the axis of the shaft 29. However, when resistance is present to free rotation of the shaft 29, as is the case when the motor 27 is idle, then the stud may be moved to any position with respect to the disc 37 to bring the indicator to a new position on the graduated dial thereon.

Figure 1:
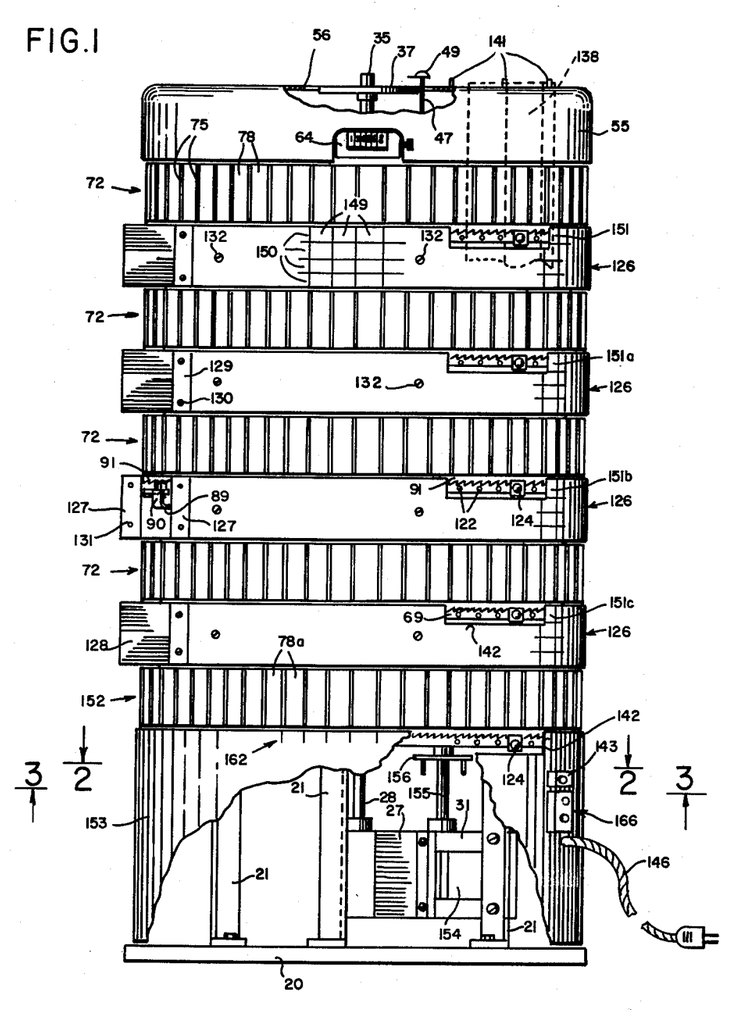
FIG. 1 is an elevational view of a machine embodying features of the present invention, with parts broken away and partly in section.

The cylindrical structure, FIG. 1, has a top cover 55 provided with an axial opening 56 which permits exposure therethrough of the disc 37 and the pointer 49. On top of the cover a zero or starting position is marked as, for example, in the form of an arrow head 57, FIG. 14. With the motor idle and therefore preventing rotation of the shaft 29 and the plate 32 and with the zero reading on the dial disc positioned in alignment with the arrow head 57, the stud 47 is swung into a position wherein the pointer is aligned with a number on the dial which is equal to the number of degree days reported for the previous day. As the shaft then rotates clockwise, FIG. 4, upon energization of the motor 27, it carries with it the crank 38, the plate 32 and the disc 37.

A bracket 58 secured to an upright 21, FIGS. 4 and 5, has mounted on an arm 59 extending downward therefrom a microswitch 60 which is normally closed and which is opened by pressing inward its lever arm 61. This lever arm lies in the orbital path of the lug 43, so that when the latter engages the lever 61 the switch, which is in circuit with the motor 27, is opened and thus stops rotation of the shaft 29. Also supported on the bracket 58 is a second microswitch 62 which is normally open when its spring biased button 63 is projected outward, i.e., downward. This switch is positioned with its button 63 extended into the circular path of the knobs 33 on the plate 32. Thus, as the plate rotates, each time the button is pressed inward, i.e., upward as a knob passes under it, the switch is closed. An electric counter is mounted on the top cross member 25 of the frame of the device and is visible through an opening in the top cover, as shown at 64. The switch 62 is in circuit with the counter and thus records on the counter the number of degree days previously set on the dial.

A roller 65 carried on an arm 66 secured to the bracket 58, is in rolling contact with the smooth portion of the top surface of the plate 32.

Figure 6:
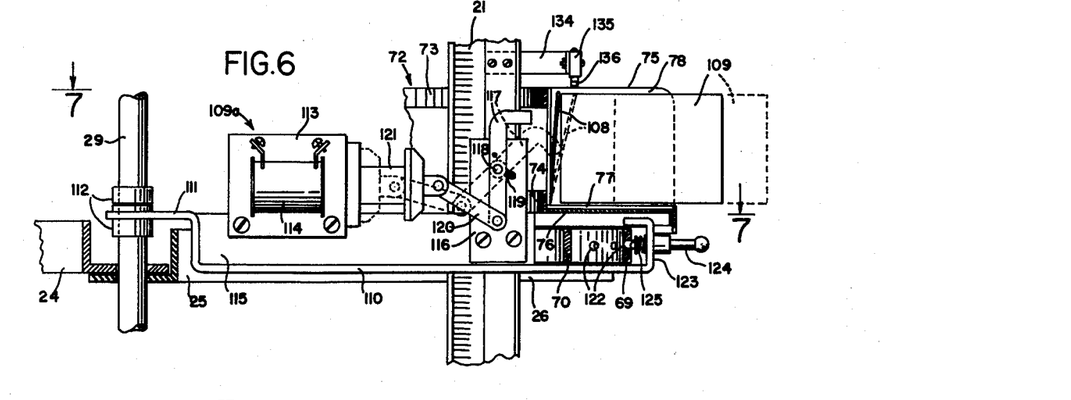
FIG. 6 is a fragmentary sectional view taken on the line 6—6 of FIG. 4.
Figures 7, 8:
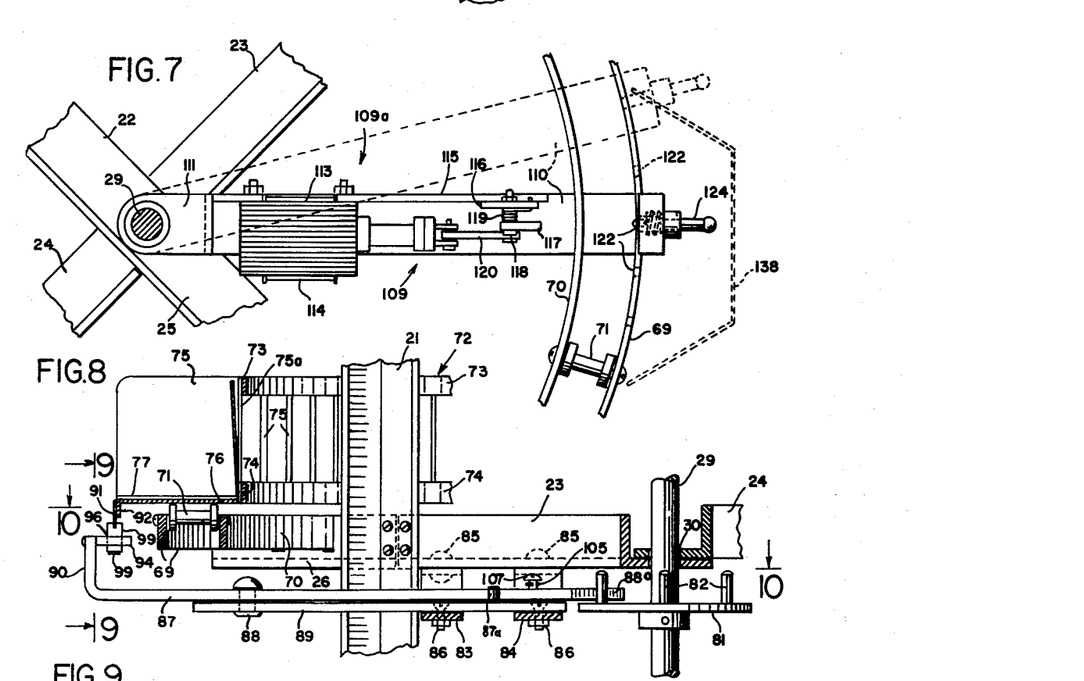
FIG. 7 is a sectional view taken on the line 7—7 of FIG. 6.
FIG. 8 is a fragmentary sectional view taken on the line 8—8 of FIG. 4.

Extending downward into each cross-member extension 26 is a transverse slot 67, FIGS. 5, 7 and 8, these slots being equidistant from the motor shaft 29. Spaced radially inward from the slots 67 on the extensions 26 are similar slots 68, also equidistant from the shaft 29. Registering frictionally in the slots 67 is a ring 69, and registering frictionally in the slot 68 is a ring 70; thus these rings are concentric. Circumferentially equidistantly spaced rollers 71 are supported between the rings 69 and 71 with their axes radial with respect to the rings and positioned to project above the rings. An annular turntable 72 is mounted above each pair of rings 69, 70. Each turntable includes aligned circular bands 73 and 74 surrounding the uprights 21, the bands being held rigidly together by being welded or otherwise secured to the angular webs or backs 75a of vertical circumferentially spaced plates or walls 75 which extend radially outward from the bands, FIGS. 4, 5, 6, 8 and 12. The bottom band 74 has an annular extension 76 rigid therewith or welded or otherwise secured thereto, and which is, or may be, also welded or otherwise secured to the bottom edges of the plates 75. It is now seen that pockets 78, FIGS. 1 and 4, which are open at the front, i.e., the radially outward ends thereof, and at the top, are formed between the plates 75. The entire turntable 72 is rotatably supported upon the rollers 71.

In the horizontal plane of each band 74, FIGS. 4 and 5, a roller 79 is mounted on a vertical axis on the upper side of each extension 26 to position it in rolling contact with the inner side of this band, thus providing for true rotation of the turntable about its axis. Also, in order to restrain the turntable from rising or being tilted upward, additional rollers 80, for the sake of clarity shown only in FIG. 5, are provided on horizontal axes and secured to the uprights 21, in rolling engagement with the top edge of the band 73.

Figure 10:
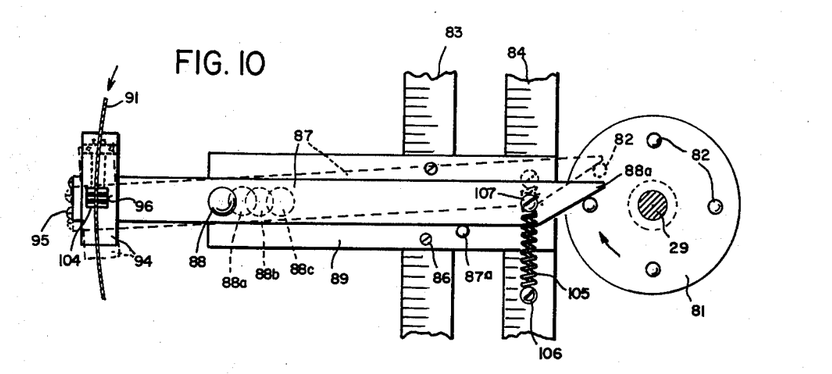
FIG. 10 is a sectional view taken on the line 10—10 of FIG. 8.

Keyed or otherwise fixed on the shaft 29 under each pair of concentric rings 69, 70, except the lowermost pair as will hereinafter be clarified, is a pin toothed wheel or gear 81, FIGS. 3, 5, 8 and 10, with its upwardly extending pins 82. Approximately U-shaped supports 83 and 84 are secured by their upwardly deformed ends, FIGS. 3 and 8, as by bolts 85, angularly between the cross-members 22 and 23 so that these supports are positioned horizontally spaced below the cross-members, FIG. 8; such supports are provided under each such cross-member except the lowermost. A plate 89, FIGS. 4, 8 and 10, is secured, as by bolts 86, to the top sides of these supports and extends radially with repect to the shaft 29. Pivoted by a pin 88 to the top of this plate is a pawl 87 whose nose 88a lies in the orbital path of the pins 82 on the wheels 81. The opposite or radially outward end of the pawl has an upwardly bent extension 90.

The annular extension 76 of the bottom member 74 of the turntable 72 has at its outer edge a circumferential depending flange 92. Welded or otherwise secured to this flange is a circular band 91 whose lower edge is serrated or provided with saw teeth 93, FIG. 9. A holder 94 is secured, as by bolts 95, in horizontal position to extend radially inward from the upper edge of the extension 90, of the pawl 87. The holder 94 has a rectangular vertical opening 96 therethrough, FIGS. 9 and 10. Vertically slidably mounted in this opening are a plurality of elongated fingers or teeth of successively increasing length (in the direction of travel of the turntable 72 indicated by the arrow in FIG. 9), three such being shown at 97, 98 and 99. Secured at one end thereof to the underside of the holder, as by a bolt 100, are three leaf springs 101, 102 and 103 each of which has such length that it engages the bottom of one of the said fingers to urge it upward. To prevent the fingers from being discharged through the upper end of the opening 96, each finger has a lateral deformation 104, FIGS. 9 and 10, on at least one side of the lower end thereof to serve as a limit stop to its upward movement.

Figure 9:
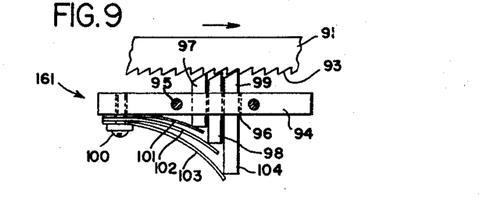
FIG. 9 is a view taken on the line 9—9 of FIG. 8.

As is to be seen in FIG. 9, the leading edge of each finger is vertical and its following edge is at an acute angle thereto; this, of course, refers to the upper or tooth extremities of the fingers. It is also to be noted that the leading edge of each saw tooth 93 slopes at the same angle as the following edges of the fingers and that the following edges of the saw teeth are vertical. Finally, it is to be noted that, FIG. 9, the width of each finger exceeds the pitch of each saw tooth. Hence, assuming that the holder 94 alternately moves from left to right and then from right to left, in moving to the right with the finger 99 actively engaging a saw tooth the band 91 will be moved the same distance to the right. However, when the holder moves to the left a sufficient distance, the middle finger 98 will slip into active engagement with the next (to the left) saw tooth, and just before this occurrence the left-hand end finger 97 will have actively engaged the second next saw tooth. Thus, even very small degrees of movement of the holder to the right will assure corresponding movement of the band 91 since one or the other of the fingers is bound to be in, or almost exactly in, active engagement with a saw tooth. When the holder moves to the left the band 91 will obviously remain stationary.

FIG. 10 shows a coiled spring 105 secured at one end to the support 84 and at the other end to the pawl 87 near its nose; the former securement is by a bolt 106 and the latter by a bolt 107. This spring normally urges the nose end of the pawl to swing clockwise toward a stop pin 87a on the plate 89; the wheel 89 also rotates clockwise. While the wheel rotates, a pin 82 carries the nose end of the pawl with it until the pin clears the nose, at which time the spring 105 pulls the nose back into the path of the next oncoming pin.

It is now apparent that the motor shaft in turning rotates the turntable 72 clockwise and swings the pawl 87 back and forth in a reciprocating movement. Thus the holder 94 on the radially outward end of the pawl alternately swings forth and back to rotate the turntable, in steps, counterclockwise, owing to the interengagement, above described, of the fingers 97, 98, 99 with the saw teeth or serrations 93.

Each pocket 78 has a flat lining or floor 77 superimposed upon the annular turntable extension 76 and secured thereto in any desired manner. Either integral with and rising from the rear end of floor 77, or having its lower portion secured as by welding or otherwise to the band 74 of the turntable, is a back wall 108 for each pocket; this back wall is in the form of a leaf spring which may be bent from its upright position shown in full lines, FIG. 12, to its position leaning forward as shown in broken lines, when properly pushed from behind. In the bent position the back wall 108 ejects all cards 109 contained in upright position in the pocket. An ejector device 109a is provided for this purpose.

A horizontal arm 110 has one end Z-shaped as at 111 so that the main body of the arm is positioned below the level of the turntable 72. The end 111 is pivoted to the shaft 29 between collars 112. A bracket 113 holding a solenoid 114 is bolted to an upright wall 115 rising from one edge of the arm 110. An upright bracket 116 is bolted to the wall 115 outward from the solenoid, and pivoted thereto approximately intermediate its length is an L-shaped member or hook 117 on a bolt 118. A coiled spring 119 surrounding the bolt biases the hook to swing counter-clockwise, FIG. 6, into its upright position shown in full lines. A link 120 is pivoted at one end to the solenoid plunger 121 and at the other end to the lower end of the hook 117. It is apparent that when the solenoid is energized to retract its plunger the hook will be rotated from its full line position, FIG. 6, to its broken line position, thereby bending the back wall 108 outward into the pocket 78 and expelling therefrom the cards 109. Upon de-energization of the solenoid the spring 119 restores the plunger thereof, the link 120 and the hook 117 to their normal, full-line positions, FIG. 6.

The outer ring 69, FIGS. 6 and 7, is provided with a number of relatively closely spaced holes 122. An upwardly extending lip 123 on the outer end of the arm 110 has slidably mounted in a hole therein and normally urged inward toward the ring 69 by a coiled spring 125, a pin 124. Thus, by locking the pin 124 in any hole 122 the arm 110 is restrained from pivotal movement on the shaft 29, and when the pin is pulled out the arm may be swung about its pivot.

A circular band 126 is mounted under each turntable 72 and, in the vertical line of the extension 90 of the arms 89, FIG. 1, these bands are split and provided with outwardly extending parallel ears 127, into the space between which the extensions 90 project. To cover this space a box cover 128 is provided, FIGS. 1 and 4, whose side walls 129 slide over the ears 127 and are secured thereto by screws 130 passed through holes 131 in the ears. The bands 126 are secured in place by screws 132 passed through circumferentially spaced threaded holes, not specifically shown, in the outer rings 69, with spacers 133, seen in FIGS. 3 and 5, therebetween.

Above each turntable 72, FIGS. 4, 5 and 6, a bracket 134 extends horizontally from the upright 21 from which the cross-arm 25 extends. This bracket has its end deformed horizontally inward and secured on the said end is a microswitch so positioned and mounted that its downwardly biased plunger-like actuating lever or button 136 is positioned radially outward from the top band 73 of the turntable so that it lies in the path of the walls 75 which define the pockets 78; this switch is shown at 135 and the button 136 is provided with a rounded lower extremity 137. This switch is normally open, that is, while the button 136 is in downwardly biased position. However, when a pocket wall 75 passes under the button it moves the button upward in an obvious manner to close the switch which again opens after the said wall 75 has moved past it.

Figure 14:
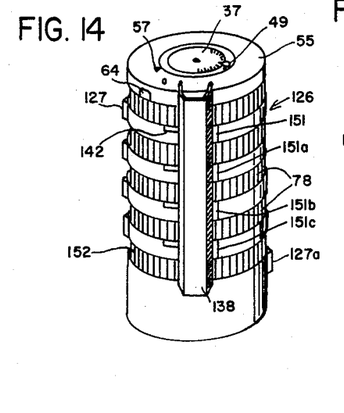
FIG. 14 is a perspective view of the complete machine, showing also the guide chute for ejected cards.
Figure 15:
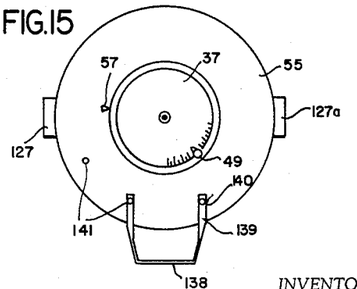
FIG. 15 is a top plan view of the machine.

A chute or the like 138, substantially U-shaped in cross-section, or channel-shaped, has fingers 139 extending from the upper end thereof, one from each web of the chute, FIGS. 14 and 15, the fingers having openings 140 therein registrable about pins 141 extending from the top of the cover 55. Thus the chute is suspended against a vertically aligned column of pockets 78. Preferably the chute is sufficiently wide to enclose at least two columns of horizontally spaced pockets. As shown in FIGS. 1, 4 and 14, the chute is circumferentially positioned within the confines of a cut-out 142 in the upper edge of each band 126 through which the pin 124 projects and which defines the arc through which the arm 110, FIG. 7, may be swung. For reasons clarified below, a third pin 141 is provided so that the chute may be shifted from the position thereof shown in FIG. 14 to the left thereof in an obvious manner.

Since the card ejector device is carried on the arm 110, and since the column of such arms is positioned within the confines of the chute in vertical alignment when the ejector is actuated, it is apparent that the cards which are discharged into the chute, which is open at the bottom, will pass out of the chute into any suitable receptacle, not shown, or on to the floor.

Figure 11:
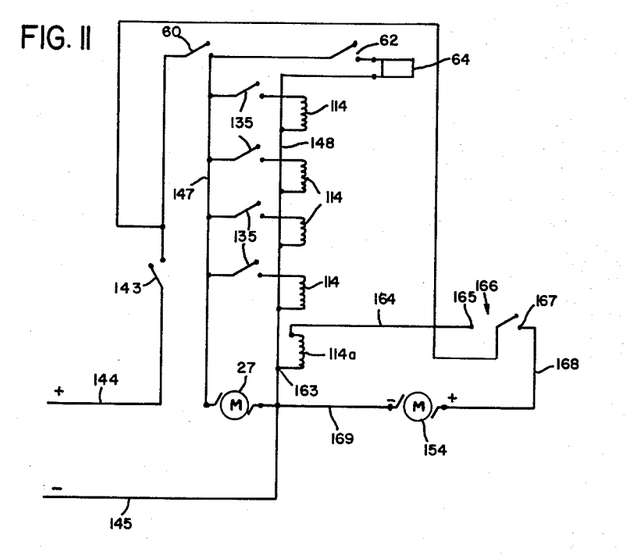
FIG. 11 is a wiring diagram.
Figure 12:
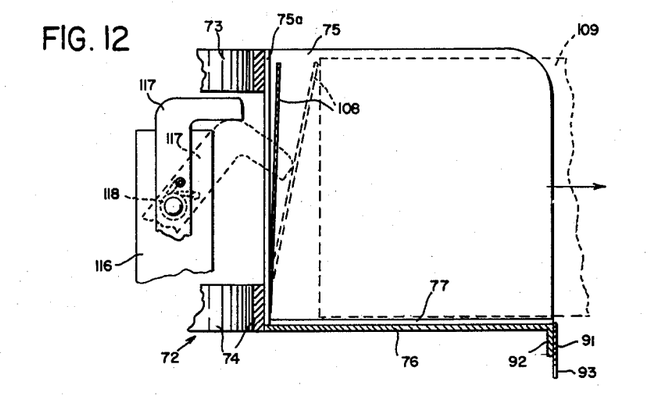
FIG. 12 is a fragmentary view taken on the line 12—12 of FIG. 4.

The wiring diagram, FIG. 11, shows a main switch 143 for closing the circuit through two leads 144 and 145 of a connector cord 146, FIG. 1. All of the solenoids 114 are connected, through the switches 135, in parallel across leads 147 and 148, the former being a continuation of the lead 144 beyond the switch 143 and being connected through the switch 60 to the lead 144. The motor 127 is bridged across the leads 148 and 145. The electric counter 64 is in series with the switch 62 and together they are connected in parallel with the leads 147 and 148.

With the switch 143 open and hence with the motor 27 idle, and with the zero reading on the dial of disc 37 aligned with the arrow head 57, as previously stated, the stud 47 is swung into position wherein the pointer 49 is aligned with a number on the dial equal to the number of degree days reported for the preceding day. The switch 143 is then closed to energize the motor 27 to rotate the shaft 29 clockwise together with the disc 37 and the plate 32, until the extension 43 engages the actuating arm of the switch 60 and thus deenergizes the motor. While the plate 32 has thus been rotating, the switch 62 was momentarily closed each time a knob 33 passed under it, so that a digit was added to the total registered on the counter 64 for each of the said degree days.

While the shaft 29 has been turning, the pin tooth wheel 81 has been turning with it to impart swinging motion to the pawl 87 and thus, through the medium of the slidable teeth 97, 98 and 99, FIG. 9, in the support 94, the band 91 fixed to the turntable 72, FIGS. 8 and 10, and hence also the turntable has been slowly rotated counterclockwise, FIG. 10. This is of course true for each of the four vertically spaced turntables 72. Thus all of the pockets 78 in advance of the position occupied by the chute 138, FIGS. 4 and 14, have been moving in the direction of the chute, the latter having been positioned with respect to the arms 110, FIGS. 4, 6 and 7, which holds the ejecting device 109a, so that the arms extend radially toward the chute.

At the beginning of the rotation of the shaft 29 as just mentioned, the actuating buttons 136 of the switches 135 would likely be positioned, in open switch position, between two successive pocket walls 75, FIGS. 4 and 5. As the first approaching pocket wall of any turntable 72 passes under its button 136 its switch 135 will be closed, thus energizing the corresponding solenoid 114 to eject into the chute the cards 109 in that pocket. The switch button 136, FIG. 4, is fixed in such circumferential position that when it is pressed upward by a wall 75, for example the wall 75b, to energize the ejecting solenoid, the ejector hook 117 will be radially positioned to align with the next antecedent pocket 78a. In the event that the motor 27 should be deenergized while a wall 75 is directly under the button 136 and hence immediately after the ejector has been actuated, it would make no difference when the motor is next energized again. For then, upon actuation of the ejector its hook 117 will act upon an empty pocket, the pocket having been previously evacuated upon the last actuation of the ejector. It is to be noted that the holes 122 in the outer ring 69, FIG. 6, are so positioned and circumferentially spaced that in each position in which the pin 124, FIGS. 4 and 7, may enter such a hole, the arm 110 is positioned in radial alignment with a pocket. Five such holes are shown in FIG. 1 and FIG. 4, confined within the arcuate cut-out 142. In case the arm 110 is swung clockwise to radially aligned position with any one of the pockets in advance of the pocket 78a, FIG. 4, the switch 135 will actuate the ejector when such one of the pockets becomes radially aligned with the arm 110, and the same holds true if the arm is shifted in the opposite direction.

Thus the operation of the machine as thus far described is entirely automatic once the pointer 49 has been swung to the position on the dial 37 which reads the number of degree days of the previous day or period and the main switch 143 has been closed. The same operation is repeated once each day, or period.

Figure 16:
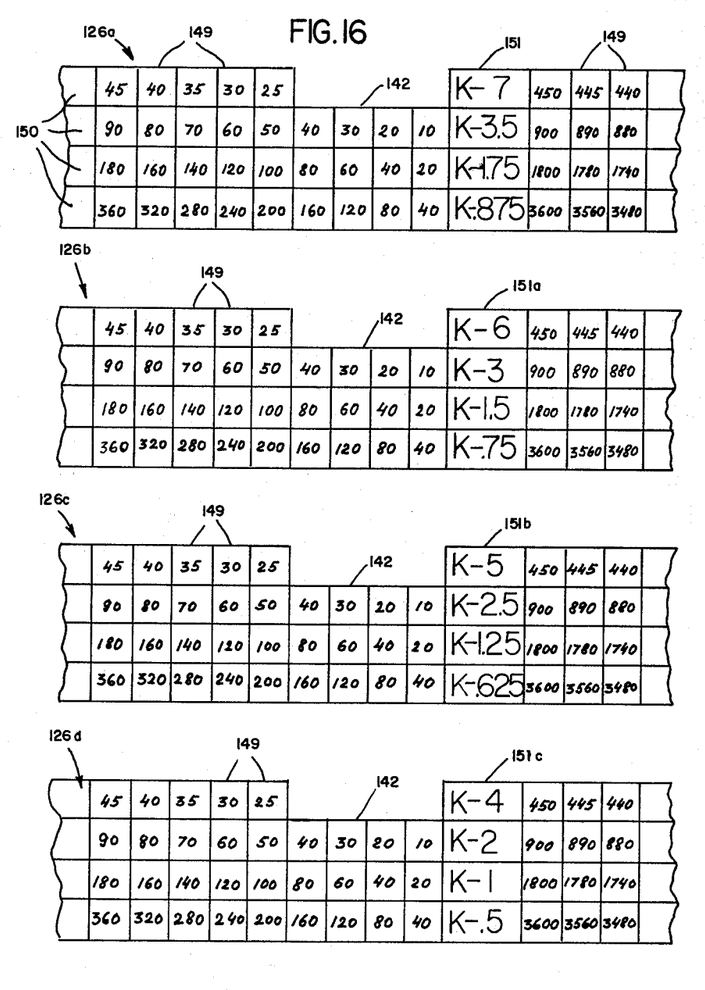
FIG. 16 is a fragmentary layout view of the four graduated bands under the upper four turntables of the machine, showing the symbols and gallonage numbers thereon.

Each band 126 is marked or imprinted as a table dividing the space on the band into a multiple of columns 149 of equal width and with four rows 150, shown in FIG. 1 on only a portion of the uppermost band 126. FIG. 16 shows in fragmentary enlarged form a portion of the four circumferential bands 126. Just to the right of the cut-out 142, FIG. 1 and FIG. 14, the bands have columns 151, 151a, 151b and 151c, in which the K factor, or consumption factors, of the various types of customers are listed. For example, the topmost band 126a lists, from top to bottom, K factors 7, 3.5, 1.75 and .875; the next lower band 126b has listed in its column 151a the K factors 6, 3, 1.5 and .75. The next lower band 126c has listed in its column 151b the K factors 5, 2.5, 1.25 and .625, while the lowermost band 126d has listed the K factors 4, 2, 1 and .5. Thus with four turntables, as illustrated, a relatively wide range of consumption factors is available. The numbers in the columns 149 and rows 150 represent gallons, in increasing order from left to right starting at the columns containing the K factors. Since the lower the K factor the higher the consumption rate, the numbers in the columns 149 increase in order from top to bottom.

In the case of the top row 150 for each band, the cut-out 142 prevents listing numbers in several columns next to the K factor column, but since the numbers in the top row 150 increase successively by the addition of the number five the absence of the lower numbers does not lead to confusion.

Although the arms 87, FIGS. 4, 8 and 10, are of the same length for all of the turntables 72, the horizontal positions of their fulcrums, that is, the pivot pins 88, all vary. For example, FIG. 10 shows in full lines the position of the pin 88 for the topmost arm 87, and to the right thereof successively the pin 88a for the next lower arm 87, the pin 88b for the third arm 87 from the top, and the pin 88c for the bottom arm 87. Hence, one turn of the shaft 29 or of the wheels 81 will advance the top turntable 72 through the shortest arc while advancing those below it through increasingly longer arcs. This is desirable since on the average the group of K factors on the lower bands are lower than those on the bands or band above them, with consequent higher relative fuel oil consumption so that the turntables will advance somewhat more rapidly toward the discharge chute.

Of course each band 126 applies to the turntable 72 immediately above the band. As a consequence of the differing horizontal positions of the fulcrums 88 of the several turntables 72, the gear ratios, as it may be termed, are, for the top turntable three and one-half to one, for the next lower turntable three to one, for the third turntable two and one-half to one, and for the bottom turntable 72 two to one.

The consumption factors of the various customers having been determined, the file card of that customer after a delivery has been made to him when his card has been ejected, is replaced in a turntable above the band in which his K factor is listed, in a pocket sufficiently in advance of the discharge chute so that it will again arrive at the chute after a number of degree days have elapsed during which his tank will again require a delivery. Deliveries are always calculated to be made before the customer's tank has been emptied; in fact each customer is allowed a reserve gallonage depending upon his consumption factor and the size of his tank, and a delivery is scheduled to be made before any or much of that reserve has been consumed.

The reason for having the arm 110, FIGS. 6 and 7, movable about its pivot on the shaft 29, as above mentioned, is to permit of an advance delivery in case heavy snow or any other condition which may make it impossible to deliver fuel in a day or two, is expected. For the same reason the chute 138 is made repositionable, or to be advanced, so that it will be in a position to receive the cards ejected in advance. Under such circumstances all of the arms 110 are advanced at the same time to the new position. However, if the arms 110 are advanced through a small arc of the width of only one pocket, for example, the chute will not need to be moved to its advanced position, since, as shown, the chute has a greater width than the arcuate spread of two pockets 78.

Referring now to the lowermost turntable 152 of the machine, which is positioned directly above a wide circumferential band or shell 153, this turntable is entirely independent of the four turntables 72, and the band 153 also serves as a housing or enclosure for the lower structure of the machine including the two motors 27 and 154. The motor 154 is also secured to the bracket 31 (FIG. 2) and its shaft 155 extends upward and has a pin toothed wheel 156 locked thereon, shown both in FIG. 3 and in FIG. 1.

The turntable 152 is in all respects the same as the turntables 72, including the saw toothed band 91, the adjustable arm 110 with its ejecting means or device 109a. However, instead of being actuated by pawl 87, it is actuated by a pawl 157 positioned in a quadrant, FIG. 3, diagonally opposite the pawl 87 as is also the motor 154. This pawl is pivoted at 158 on a support 159 held by crossmembers 83a and 84a, similar to the members 83 and 84. A spring 159a normally swings the inner end of this pawl back into engagement with the pins 160 on the wheel 156, in the same manner as previously described for the pawl 87. On the outer end of this pawl the same interengaging means 161 of FIG. 9 is applied for rotation of the turntable by the reciprocating pawl, shown covered by a similar box-like structure 127a.

The upper circumferential edge of the shell 153 is provided with graduations 162 spaced apart a distance equal to the width of a pocket 78a, and the same cut-out 142 is provided therein.

The wiring diagram, FIG. 11, shows the solenoid 114a, not otherwise shown but identical to the solenoids 114 for the turntables 72, with one terminal 163 connected to the lead 148 and its other terminal connected by a lead 164 to one pole 165 of a double throw switch 166. The other pole 167 of this switch is connected by a lead 168 to one side of the motor 154. A lead 169 connects the other side of this motor to the lead 148.

As mentioned before, the turntable 152 serves to hold the cards of large consumers who require periodic delivery independently of the number of degree days elapsed since the previous delivery. The double throw switch 166 has a neutral position in which it engages neither pole 165 or 167. When it is desired to turn the turntable 152, the switch is operated to close contact with the pole 167 to energize the motor 154. The switch is kept closed until the turntable 154 has been rotated through an arc of the width of one box 78a. Then the switch is thrown to close contact with the other pole 165 to actuate the discharge solenoid 114a, after which the switch is restored to neutral position.

The wiring diagram of FIG. 11, including its showing of switches, is entirely diagrammatic and elementary and serves merely to illustrate the electrical operation of the machine. The choice of the kind or type of switches to serve the purpose of such operation is of course immaterial. No such electrical elements as transformers have been shown for alternating current operation as such are well known as well as whatever wiring arrangements may be necessary for their use. Nor have any gear reduction means or relays been shown, as their application and use are conventional.

In the case of the turntable 152, a limit switch, not shown, could readily be used for automatic and simultaneous stopping of the turntable and energization of its card ejecting solenoid.

In the case of all of the turntables 72 the turn of a turntable through the width of a pocket 78 represents a chosen number of degree days or gallons of fuel oil. In one constructed machine, for example, the width of a pocket 78 is equal, approximately, to fifty degree days, the total number of elapsed degree days since use of the machine being at all times indicated on the counter 64. For small businesses, that is, such as have not over one thousand customers, a machine with but a single turntable 72 should suffice. As for the graduations 162 on the wide lowest band 153, gallonage numbers in increasing order from right to left, FIG. 1, not shown, may be marked thereon of magnitudes suitable to the high consumption rates of such customers whose cards are filed in the turntable 152. For the simple one turntable machine, that is, one turntable 72, the graduations on the band 126 are preferably marked in degree days instead of gallons.

It is obvious that the machine herein disclosed may also be used, in whole or in part, for ejecting from the turntables articles other than cards, and for purposes not related to the subject of fuel delivery.

While the invention has been described with particular reference to the structures shown in the drawing such is not to be construed as a limitation upon the invention which is best defined in the appended claims.

The invention having thus been described, what is claimed and desired to be secured by Letters Patent is as follows:

1. A machine having an upright supporting frame including horizontal supports, a generally cylindrical horizontal band encircling said supports and secured thereto, a vertical shaft rotatably mounted in the frame along the axis of said band, a turntable rotatably supported on said supports in axial alignment with said band, means constraining the turntable to rotational movement on its axis, means connecting the shaft with the turntable for rotation of the turntable by the shaft, the turntable including an annular floor and equidistantly circumferentially spaced radial walls extending upward from the floor thereby providing circumferentially spaced radial pockets adapted to have cards placed therein, an electric motor for rotation of the shaft, means for ejecting the cards radially outward from each of said pockets in succession upon rotation of the turntable to carry a pocket to a given circumferential position, said given position lying in a vertical plane through a given fixed point on said band, said ejecting means including a solenoid for actuating the same to eject cards from a pocket arrived at said first-named given position upon energization of the solenoid, a normally open first switch secured to the frame having a switch-closing member biased to project outward into the orbital path of said walls and positioned approximately in said vertical plane, said switch being adapted to be closed by pushing the switch closing member inward by a passing pocket wall, said switch being connected in series circuit with the solenoid for energization of the solenoid upon closing of the switch.

2. A machine according to claim 1, having a circular plate fixed to the shaft and positioned above said turntable, a crank pivoted to said shaft, releasable friction clutch means normally interlocking the crank and the plate for simultaneous rotation by the shaft of the crank and the plate, a normally closed second switch in series with the motor mounted on the frame and having an outwardly biased switch opening member projecting into the orbital path of the crank for opening the second switch upon engagement of the crank with the switch opening member thereof, the second switch and the motor being connected in series in an electrical circuit, said clutch means being yieldable to permit manual swinging of the crank with respect to the plate when the motor is idle owing to the inertia of the motor and said shaft, the crank being adapted to be swung from a position in which the same is in engagement with said member of the second switch to an arcuate position in advance thereof prior to energizing of said last-named circuit.

3. A machine according to claim 2, said crank being positioned below said plate and having an upright arm on the outer end thereof provided with a radial pointer, the pointer being positioned above the plate, a graduated dial disc rotatably mounted on the shaft and positioned between the plate and the pointer, and clutch means normally locking the disc on the shaft.

4. A machine according to claim 2, having an electric digital counter mounted in a visible position thereon, said plate having equidistantly circumferentially spaced projections of equal length thereon, a normally open third switch mounted on the frame and having an outwardly biased switch closing member projecting into the orbital path of said projections, said third switch being adapted to be closed intermittently upon successive engagement of said projections with the switch closing member thereof, said third switch being connected in series with the counter for advancing the counter a digit upon each successive such engagement.

5. A machine having an upright supporting frame, a plurality of vertically spaced axially aligned turntable rotatably mounted on the frame, means constraining the turntables to rotational movement, the turntables having annular floors provided with equidistantly circumferentially spaced upstanding radial walls dividing the turntables into circumferentially spaced pockets adapted to hold cards, a vertical shaft mounted in the frame, speed reducing means connecting the turntables with the shaft, an electric motor for driving the shaft, a solenoid for each turntable mounted on the frame radially inward of the floor thereof and provided with means for pushing the cards radially outward from a pocket upon energization thereof, all of the solenoids being normally positioned in a common vertical plane, a circular horizontal band for each turntable secured to the frame adjacent the turntable in axial alignment therewith, the bands having fixed points marked thereon and lying in said plane, and normally open switch means in circuit with each of the solenoids for selectively energizing the solenoids when a pocket of the turntable associated with a solenoid has been moved into said plane.

6. A machine according to claim 5, said shaft being axially aligned with the turntables, each of the solenoids having a horizontal arm rigid therewith, the horizontal arms being pivoted to said shaft, and means for releasably locking the arms selectively in any of a plurality of given arcuately spaced positions at an arcuate distance from said plane, said given arcuately spaced positions being spaced apart a distance equal to the width of a pocket.

7. A machine according to claim 6, said frame including under each turntable a pair of concentric rings coaxial with the turntables and positioned spaced below the turntable floors, rollers supported in the rings and projecting above the rings, the turntables resting on said rollers, said horizontal arm for each turntable being positioned below the rings of the associated turntable and projecting radially beyond the outer of the rings and having upwardly extending extremities, said last-named means comprising recesses in the outer rings in said given arcuately spaced positions and spring biased pins in said extremities registrable in said recesses.

8. A machine according to claim 5, said speed reducing means including a separate speed reducing means for each of the turntables, each of said separate speed reducing means having a speed reducing ratio different from the speed reducing ratios of the others thereof.

9. A machine according to claim 5, said shaft being axially aligned with the turntables, said switch means comprising a normally open first switch secured to the frame having a switch closing member biased to project outward into the orbital path of said walls and positioned approximately in said plane, said switch being adapted to be closed upon pushing the switch closing member inward by a passing pocket wall, the switch being connected in circuit with the solenoid for energizing the solenoid upon closing of the switch.

10. A machine according to claim 9, having a circular plate fixed to the shaft and positioned above the topmost turntable, a crank pivoted to said shaft, releasable clutch means normally interlocking the crank and the plate for simultaneous rotation by the shaft of the crank and the plate, a normally closed second switch in series with the motor mounted on the frame and having an outwardly biased switch opening member projecting into the orbital path of the crank for opening the switch upon engagement of the crank with said member of the second switch, said clutch means being yieldable to permit manual swinging of the crank with respect to the plate when the motor is idle owing to the inertia of the shaft and the motor, the crank being adapted to be swung from a position in which the same is in engagement with said member of the second switch to a position arcuately in advance therof prior to energizing the series circuit through the motor and the second switch.

11. A machine according to claim 10, said crank being positioned below said plate and having an upright arm on the outer end thereof provided on its upper end with a radial pointer, a graduated dial disc rotatably mounted on said shaft above said plate and having the pointer positioned to point to the graduations on the disc, and clutch means normally locking the disc on the shaft.

12. A machine according to claim 10, having an electric digital counter mounted in a visible position thereon, said plate having equidistantly circumferentially spaced projections of equal length thereon, a normally open third switch mounted on the frame and having an outwardly biased switch closing member projecting into the orbital path of said projections, said third switch being adapted to be closed intermittently upon successive engagement of said projections with the switch closing member thereof, said third switch being connected in series with the counter for advancing the counter a digit upon each such successive engagement.

13. A machine having an upright supporting frame including horizontal supports, a generally cylindrical horizontal band encircling said supports and secured thereto, a vertical shaft rotatably mounted in the frame along the axis of said band, a turntable rotatably supported on said supports in axial alignment with said band, means constraining the turntable to rotational movement on its axis, means connecting the shaft with the turntable for rotation of the turntable by the shaft, the turntable including an annular floor and equidistantly circumferentially spaced radial walls extending upward from the floor thereby providing circumferentially spaced radial pockets adapted to have cards placed therein, an electric motor for rotation of the shaft, means for ejecting the cards radially outward from each of said pockets in succession upon rotation of the turntable to carry a pocket to a given circumferential position, said given position lying in a vertical plane through a given fixed point on said band, said means connecting the shaft with the turntable comprising a wheel fixed on said shaft, a pawl pivotally mounted on the frame on a pivot positioned between the ends of the pawl, the wheel having circumferentially spaced pins extending therefrom and arranged in a circle concentric with the shaft, one end of the pawl extending into the orbit of said pins for reciprocating movement thereof by the wheel, the other end of the pawl having at least one upright spring biased tooth thereon, the turntable having a downwardly extending circumferential flange thereon provided with serrations on its lower edge in engagement with said tooth.

14. A machine for automatically ejecting customers' record cards when fuel delivery is due consisting of an upright frame having a fixed stationary band circular in outline and positioned in a horizontal plane, and a turntable rotatably mounted on the frame in axial alignment with the band and in a plane parallel with said horizontal plane, a motor for rotating the turntable, the turntable having equidistantly circumferentially spaced radial pockets open at their radially outward ends and adapted to contain the customers' record cards, means for presetting the machine before energization of the motor to predetermine the arcuate distance through which the turntable is to be rotated after energization of the motor, said arcuate distance being proportionate to the number of degree days elapsed during an immediately previous interval of time, means for opening the circuit through the motor at the completion of rotation of the turntable through said arcuate distance, and means for ejecting the cards from successive pockets of the turntable as such pockets arrive at a given position lying in a common vertical plane through a given point on the band.

15. A machine according to claim 14, having a shaft driven by the motor and axially aligned with the turntable, said last-named means being mounted radially with respect to the turntable and having an arm supporting the same and pivoted to said shaft, and means for releasably locking said arm in said given position and in a plurality of positions in advance of and beyond said given position, all of said positions being arcuately spaced apart at a distance equal to the width of a pocket.

16. A machine for automatically ejecting customers' record cards when fuel delivery is due having an upright supporting frame provided with a horizontal cylindrical band, a turntable rotatably mounted on the frame adjacent said band and in axial alignment therewith, means constraining the turntable to rotational movement on its axis, the turntable having circumferentially equidistantly spaced radial pockets open at their radially outward ends, said pockets being adapted to hold customers' record cards, an electric motor for rotating the turntable, means for ejecting said cards radially outward from the pockets in succession as a pocket arrives at a given circumferential position during rotation of the turntable, said given position lying substantially in a vertical plane through a given fixed point on said band, the turntable being adapted to be rotated by the motor through an arc whose length is proportional to a selected number of degree days, and control means for presetting the machine before energization of the motor to limit rotation of the turntable to a length of arc which is proportional to the selected number of degree days.

17. A machine for automatically ejecting articles therefrom consisting of an upright supporting frame, a plurality of vertically spaced aligned turntables mounted on the frame, means constraining the turntables to rotational movement, a vertical shaft rotatably mounted in the frame, an electric motor for rotating the shaft, the turntables having circumferentially equidistantly spaced radial pockets open at their radially outward ends and adapted to contain said articles, a circular horizontal band for each turntable secured to said frame adjacent the turntable in axial alignment therewith, the bands having fixed points thereon all positioned in a common vertical plane, a separate speed reducing means connecting each of said turntables with said shaft wherein the ratios of speed reduction all differ from each other, and means for ejecting said articles from successive pockets of the turntables as such pockets arrive at said plane during energization of the motor.

18. A machine according to claim 17, having control means for presetting the machine before energization of the motor to predetermine the relative arcuate distances through which the turntables are to be rotated after energization of the motor, such relative arcuate distances being proportional to the reduction ratio of the speed reducing means for each turntable.

19. A machine according to claim 18, said means for ejecting said articles consisting of a plurality of ejectors equal in number to the number of said turntables, the ejectors normally lying in said plane and extending radially with respect to the turntables, one of the ejectors being provided for each of the turntables.

20. A machine according to claim 19, each of said ejectors having an arm supporting the same and pivoted to said shaft whereby the ejector may be swung through an arc, and means for releasably locking each of said arms selectively in a position wherein its ejector lies in said plane and in a plurality of positions wherein its ejector is positioned in advance of or beyond said plane, all of said positions of the ejector being arcuately spaced apart at a distance equal to the width of a pocket.

21. A machine according to claim 20, having a substantially vertical guide chute of substantially greater width than the width of a pocket positioned to guide ejected articles in a downward direction, and means partly on the chute and partly on said frame for selectively securing the chute to the frame in either of two circumferentially mutually adjacent positions.

22. A machine comprising an upright supporting frame, a plurality of vertically spaced turntables mounted on the frame, means constraining the turntables to rotational movement, a circular horizontal band for each turntable secured to said frame adjacent the turntable in axial alignment therewith, the bands having fixed points all positioned in a common vertical plane, one of the turntables being the bottommost turntable and the others of the turntables being those which are positioned above the bottommost turntable, all of the turntables having equidistantly circumferentially spaced radial pockets open at their radially outward ends and adapted to hold cards of fuel receiving customers, a vertical shaft rotatably mounted in the frame, a first electric motor for rotating said shaft, a separate speed reducing means connecting each of said other turntables with said shaft wherein the ratios of speed reduction all differ from each other, means for ejecting the cards from successive pockets of said other turntables as such pockets arrive at said plane during energization of said motor, a second electric motor for rotating said bottommost turntable, and means for ejecting the cards from successive pockets of said bottommost turntable as such pockets arrive at said plane during energization of said second motor.

References Cited in the file of this patent

UNITED STATES PATENTS 2,359,182    Wilsey _______________ Sept. 26, 1944